(12) United States Patent
Karstens

(10) Patent No.: US 8,015,509 B2
(45) Date of Patent: Sep. 6, 2011

(54) SELECTIVELY LOCKING GUI CONTROLS TO PREVENT ACCIDENTAL OPERATIONS IN A COMPUTING ENVIRONMENT

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 11/939,835

(22) Filed: Nov. 14, 2007

(65) Prior Publication Data

US 2009/0125850 A1 May 14, 2009

(51) Int. Cl.
*G06F 3/00* (2006.01)
(52) U.S. Cl. .................... 715/866; 715/809; 715/764
(58) Field of Classification Search .................. 715/846
See application file for complete search history.

(56) References Cited

U.S. PATENT DOCUMENTS

| 5,499,040 | A | * | 3/1996 | McLaughlin et al. | 715/823 |
| 2005/0052458 | A1 | * | 3/2005 | Lambert | 345/440 |
| 2005/0154935 | A1 | * | 7/2005 | Jin | 713/324 |
| 2006/0010397 | A1 | * | 1/2006 | Laffey | 715/808 |

* cited by examiner

*Primary Examiner* — Tadeese Hailu
*Assistant Examiner* — Darrin Hope
(74) *Attorney, Agent, or Firm* — Patents on Demand, P.A.; Brian K. Buchheit; Scott M. Garrett

(57) ABSTRACT

The present invention discloses a solution to add a user selectable lock to a GUI control, such as a close button. The lock can be imposed on an individual window. After being applied, a user will have to explicitly unlock the control before the control can be selected, which prevents inadvertent selections of the locked control. For example, a lock can be placed on a close control to prevent accidental closing of a window. Locks can be manually or automatically applied. Automatically applied locks can be associated with a set of user configurable rules, which can also establish rules for automatically unlocking GUI controls. An applied GUI control lock can be unlocked in a user configurable manner, with any level of security.

4 Claims, 3 Drawing Sheets

SELECTIVELY LOCKING GUI CONTROLS TO PREVENT ACCIDENTAL OPERATIONS IN A COMPUTING ENVIRONMENT

BACKGROUND

1. Field of the Invention

The present invention relates to the field of graphical user interfaces (GUIs) and, more particularly, to selectively locking GUI controls to prevent accidental operations in a computing environment.

2. Description of the Related Art

The most commonly used interfaces on computing devices are those provided by the operating system. An operating system (OS) is the software that manages the sharing of the resources of a computer. Most operating systems come with an application that provides a user interface for managing the OS, such as a command line interpreter or graphical user interface (GUI). Most GUI OS's have a multitasking capability, in which multiple tasks share common processing resources, such as a central processing unit (CPU). Different windows in a GUI can be simultaneously present in a multitasking GUI OS.

There are many common GUI elements that most operating systems share. For example, it's common for content displayed in dialog boxes referred to as "windows." It's also common for these windows to contain a title bar at its top displaying the title of the window. Another common element is containing three controls, or action buttons, on the title bar. These common controls are close, minimize, and maximize/restore. The close control commonly sends a message to the window to close the window and terminate its process. The minimize control can allow the window to be minimized and moved off-screen onto another common GUI element to switch between running applications. When the maximize/restore button is in the maximize state, it can allow the window to be resized to fill the contents of the screen. At this point, the button commonly changes to its restore state, which can allow the window to be resized to not fill the entire screen.

There are certain situations when using a computing device that can result in accidental presses on the wrong dialog control. FIG. 1 (Prior Art) shows a system 100 of a situation that can cause an accidental press on the wrong dialog control. In system 100, desktop environment 105 can be an interface running on a computing device. Desktop environment 105 can have two open windows, bottom application 110 and topmost application 115. In the situation of system 100, the window controls 112 of bottom application 110 are overlapped by window controls 118 of topmost application 115. In such situations, a user may attempt to click on a close control in window controls 112 of bottom application 110, but miss and click the close control in window controls 118 of topmost application 115. In this case, the user can lose the current work in the window they accidentally closed. A frequency with which windows are closed makes it cumbersome to prompt a user to confirm closing every window. Currently, there are no intuitive ways to prevent the accidental close operation other than imposing a draconian confirmation prompt before every close action. What is needed is a user selectable mechanism to assign additional protections on a control-by-control basis.

SUMMARY OF THE INVENTION

The current invention discloses a solution to add a user selectable lock to a GUI control, such as a close button. The lock can be imposed on an individual window. After being applied, a user will have to explicitly unlock the control before the control can be selected, which prevents inadvertent selections of the locked control. For example, a lock can be placed on a close control to prevent accidental closing of a window. Locks can be manually or automatically applied. Automatically applied locks can be associated with a set of user configurable rules, which can also establish rules for automatically unlocking GUI controls. An applied GUI control lock can be unlocked in a user configurable manner, with any level of security. For example, the lock can be unlocked with authentication such as a username and password combination. In another example, the lock can be unlocked with the press of a hotkey, or a configurable key combination (i.e. CTRL+F9). In yet another example, the lock can require a double-click or single right-click to unlock.

In the disclosed solution, the GUI control locks can be manually or automatically applied to only those situations that merit special protection. For example, a user may apply a lock to a group chat session window, as closing the window can require the user to be re-invited into the group chat to the inconvenience of all. In contrast, individual chat sessions can remain generally unlocked, since re-initiating them is less problematic for a user compared to a group chat session.

The present invention can be implemented in accordance with numerous aspects consistent with the materials presented herein. One aspect of the present invention can include a method for preventing inadvertent activation of a graphical user interface (GUI) control. The method can include a step of applying a lock against a GUI control based upon a user established setting. An activation of the GUI control can be prevented when locked.

Another aspect of the present invention can include a method for preventing an unintentionally closing of a window. In the method, a user selectable mechanism can be provided for locking and unlocking a close window control of a window within a graphical user interface. An event associated with the user selectable mechanism can be detected that changes a locking state of a close window control. Responsive to the event, the locking state of said close window control can be changed. Locking states can include a locked state and an unlocked state. When the close window control is in a locked state, a user can be prevented from performing an action to activate the close window control. When the close window control is in an unlocked state, a user can be permitted to perform an action to activate the close window control.

Still another aspect of the present invention can include a graphical user interface (GUI) control that includes an option to lock a user activate-able GUI control so that said control must be unlocked before being activated. When the lock is applied against the user activate-able GUI control, a visual indicator can appear near the user activate-able GUI control that visually indicates that the user activate-able GUI control is locked.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
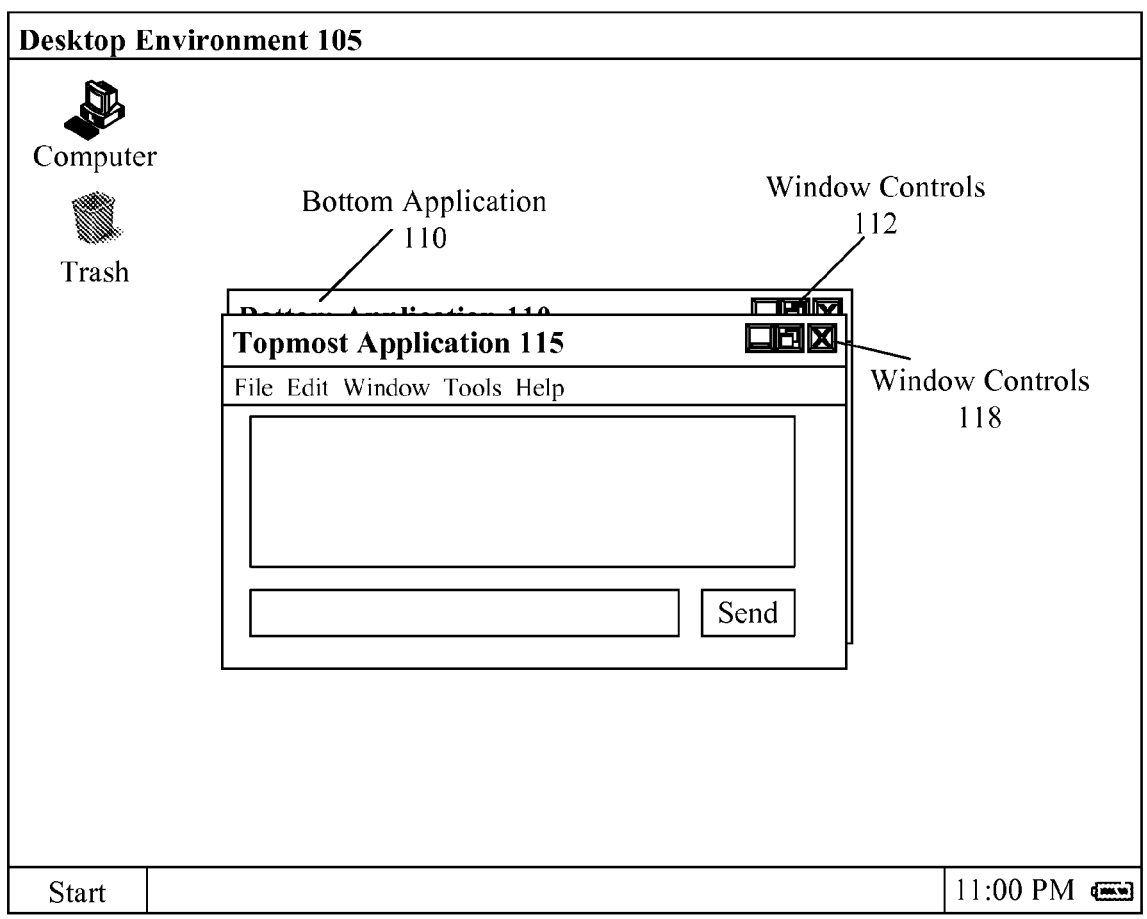
FIG. 1 (Prior Art) illustrates a situation that can cause an accidental operation on a GUI control.
Figure 2:
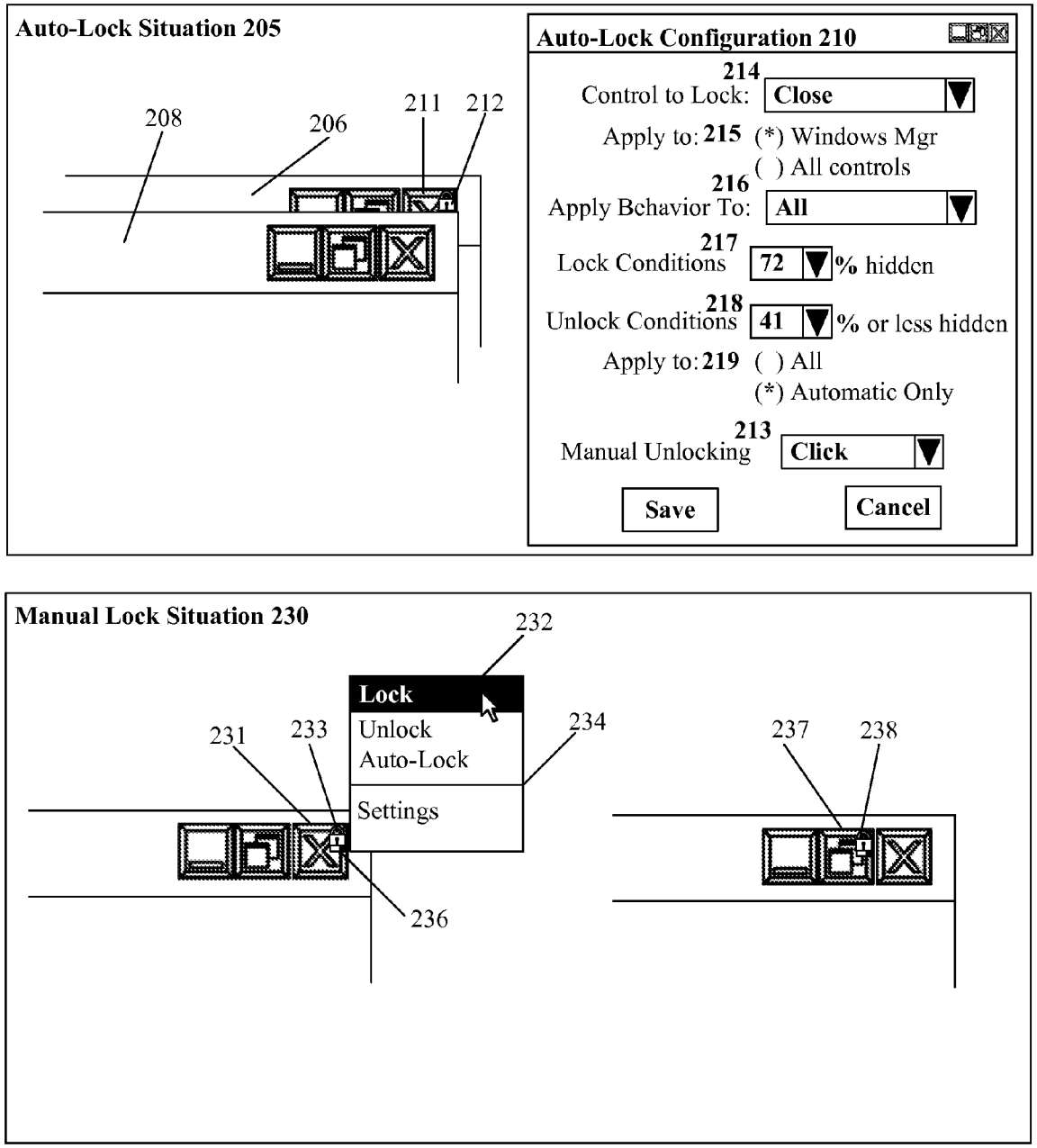
FIG. 2 is a schematic diagram of a system for locking GUI controls to prevent accidental operations in a computing environment in accordance with an embodiment of the inventive arrangements disclosed herein.

FIG. 2 is a schematic diagram of a system 200 for locking GUI controls to prevent accidental operations in a computing environment in accordance with an embodiment of the inventive arrangements disclosed herein. As disclosed, GUI controls can be locked/unlocked based upon manual (situation 230) selections or automatic (205) settings. A visual indicator 212, 233, 238 can be presented next to a locked control. Once locked, an explicit user unlocking action can be required before control use is permitted. Use of GUI control locks can prevent inadvertent selections of a control, while not imposing additional requirements on all controls. Unlike programmatically established confirmation prompts that are imposed at a programming level, the disclosed GUI control locks can be established by individual users in accordance with individual user preferences.

In a situation 205 where automatic locks are imposed on GUI controls, users can adjust auto-lock behavior using an auto-lock configuration window 210. Window 210 can include configurable options for selecting a type of control to lock 214, for locking conditions 216, and/or for unlocking conditions 218. Selector 214 can allow the specification of a GUI control to lock, such as a close button, a maximize button, a minimize button, and the like.

Window 210 can include an option 215 to apply auto-locking behavior to only windows management controls, or to all controls of a specific type. Windows management controls can be operating system/windows management level controls, such as window controls appearing in the upper right hand side of all windows. Selecting all controls with option 215 can apply auto-lock settings to application level controls as well, such as menu selection items, application toolbars, buttons appearing within an application, and the like. For instance, selecting all controls for a close type can impose a lock against a management-level close or "X" control as well as an exit option under a file menu of an application, and an exit button appearing within an application.

Option 216 of window 210 can permit a user to define a scope for applying locking/unlocking behavior. The scope option 216 can apply to all applications, to only specific applications (e.g., a chat application, a word processing application, etc.), or to only specific (user configurable) windows within a given application.

Locking conditions 217 can include configurable options for determining when a lock is to be applied. As shown, the locking condition 217 locks a control when a window is seventy-two percent hidden or greater. In another example, the locking condition can lock a control when the control, as opposed to the window, is seventy-two percent hidden or greater.

Unlocking conditions 218 can include configurable options for determining when a previously applied lock is to be removed. Unlocking actions can apply to all GUI control locks or to only those automatically applied, depending on a setting of option 219. As shown, the unlocking condition 218 specifies a control is to be unlocked when a window is forty-one percent hidden or less. In a different implementation, unlocking condition 218 can specify that a control is to be unlocked when the control is forty-one percent hidden or less. In one embodiment, one of the unlocking conditions 218 can be an acquiring of window focus. For example, all controls on windows not having focus can be automatically locked, which are automatically unlocked when that window obtains focus.

Manual unlocking mechanism 213 can be used to configure actions needed to manually unlock an otherwise locked GUI control. These actions can include, for example, pressing a hot-key combination when a locked window is active, clicking on a lock icon, enter a username/password when unlocking a control, and other user configurable actions.

Additionally, all control locking features may be implemented so that lock settings are unable to be manipulated unless a window containing a control has focus. For example, a user can right click on a lock icon 212, 233 to unlock a control, which occurs if the clicked-upon window has focus. If the window lacks focus initially, right clicking on the lock icon 212, 233 a first time can give focus to the window containing the control. Right clicking a second time can change a lock state of the control, or can call up options for changing this state, as shown by menu 234. Further, a configurable time delay can be added to a locked control (e.g., two seconds) to ensure that a window is not granted focus and a lock state changed so quickly that mistakes are possible. For example, many users click a window so rapidly in succession (especially on slow machines or machines suffering from processing delays) that multiple clicks are provided before a first action is taken, which could result in a window receiving focus, a lock state changing, and an otherwise locked control being enabled. The time delay between a window receiving focus and a locked control changing to a manipulate-able state can prevent such mistakes.

The controls and conditions appearing within configuration window 210 are for illustration purposes only and are not intended to provide exhaustive coverage of contemplated configuration options. Configuration options for the locking/unlocking mechanism can be of arbitrary complexity so long as deterministic programmatic rules and conditions are able to be defined. For example, additional scope 216 or context restrictions can include configurable settings for a time of day, as specific times of day can be more distracting to a user than others making it more likely that windows will be inadvertently closed. In another example, conditions 217, 218 can be based upon an amount of time a window is open, where historical information concerning usage behavior can be considered when applying/releasing a GUI control lock. In one embodiment, available conditions 217, 218 can depend upon other configuration settings. For instance, conditions 217, 218 for locking/unlocking GUI controls can be based on an importance of a message, when applied to an email application level (e.g., email application specified in option 216).

No matter what conditions are specified within window 210, these locking/unlocking conditions can be automatically applied to GUI controls, such as control 211 of window 206. As illustrated for situation 205, window 208 can overlap window 206. The overlapping can obscure window 206 by more than seventy two percent, which is a setting of lock condition 217. Therefore, a lock 212 can be imposed on a close control, as specified by options 214 and 215 of window 210. A user selecting control 211 will be prevented from activating it (closing window 206 via control 211) until the lock 212 is removed. The lock 212 can be removed by performing an action specified in option 213 (e.g., clicking on the lock 212 to disable it) and/or by changing a state of window 206 so that unlocking condition 218 is satisfied (e.g., the window 206 is moved so that it is forty-one percent hidden or less).

Manual lock situation 230 illustrates a scenario in which a lock 233, 238 is applied/removed to/from a GUI control 231 or 237. As shown, a click on control lock 236 can cause pop-up menu 234 to appear. Options, such as lock 232, unlock, enable auto-lock, configure locking behavior, and the like can appear in menu 234. Depending on which settings are selected in menu 234, can change which indicator 233 appears in control 231 and can change locking behavior imposed on control 231.

Locking/unlocking settings can be applied to any GUI control and is not restricted to controls that close a window. For example, a GUI control lock 238 has been imposed on a maximize control 237 in the illustrated example. That is, use of control locks can be used to prevent accidental toolbar icon clicks, file menu item clicks, application text button clicks, hot-key combinations that activate a GUI control, etc.

Figure 3:
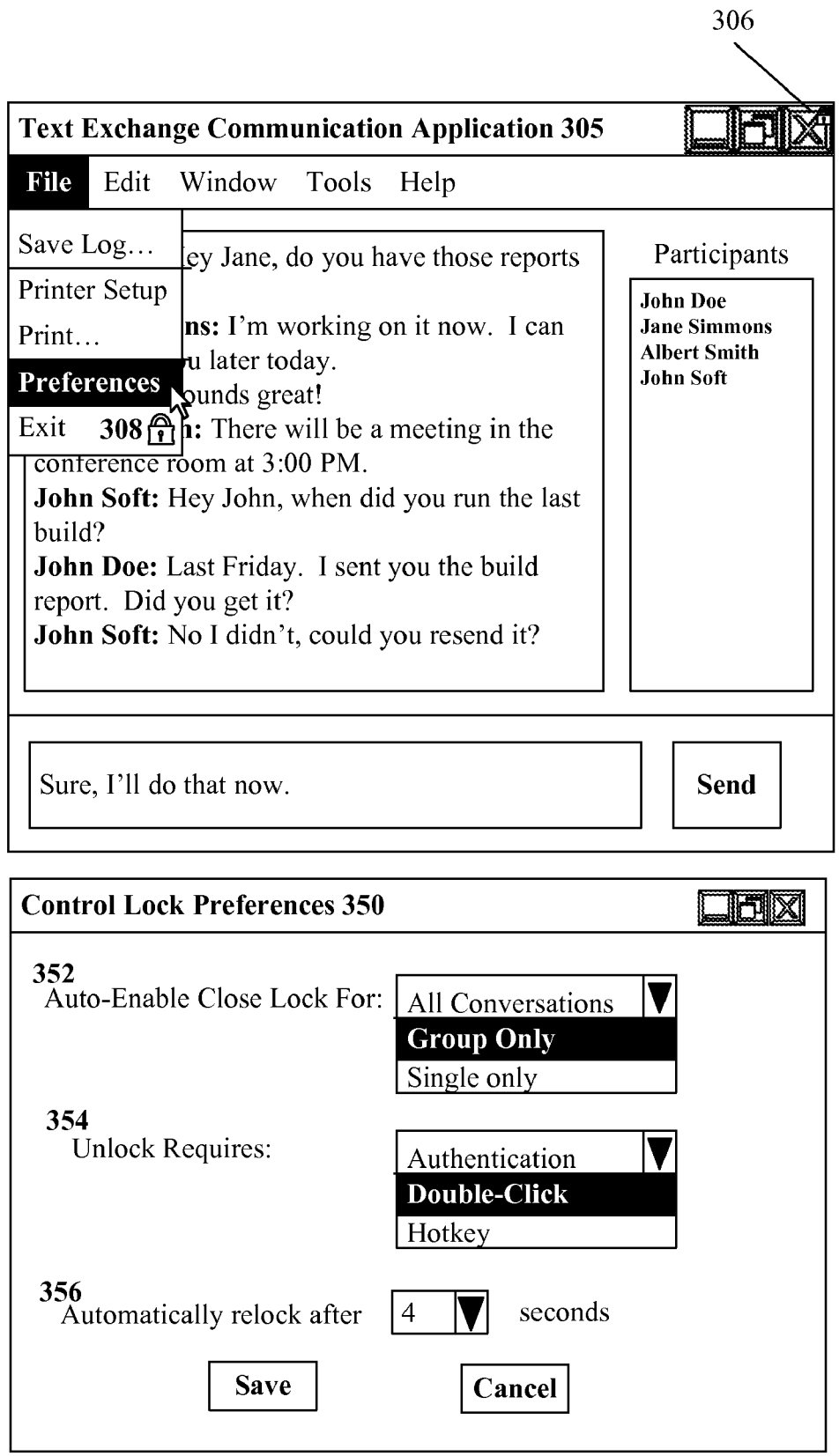
FIG. 3 illustrates user interfaces showing a sample use of a GUI control locking mechanism in accordance with an embodiment of the inventive arrangements disclosed herein.

FIG. 3 illustrates user interfaces 305, 350 showing a sample use of a GUI control locking mechanism in accordance with an embodiment of the inventive arrangements disclosed herein. The interfaces 305, 350 can represent specific instances for system 200.

As shown, interface 305 is an interface of a text exchange communication application for a text exchange communication session in which multiple people can communicate at once. Control locks 306 and 308 can be applied to prevent the interface 305 from being closed without an unlock action being performed. Appreciably, lock 306 can be a windows management level lock and lock 308 can be an application level lock, which are both applied to the text exchange communication application. Applying or removing one lock 306, 308 can have a corresponding effect on the other, although settings can be configured to permit locks 306 and 308 to operate independent of one another.

Text exchange communication application of interface 305 can be an application capable of text exchange communication with multiple parties simultaneously (i.e. group chats). Commonly to join a currently running group chat, an invitation is required. The application makes use of control locks 306 and 308 to prevent the accidental closing of application 305, which would require an invitation back into the session. Application 305 can be implemented any way, including, but not limited to, many common text exchange communication applications, such as LOTUS SAMETIME, AOL INSTANT MESSENGER (AIM), WINDOWS LIVE MESSENGER, or the like. In various embodiments, the control locks 306, 308 can be implemented in code external to the text exchange communication application and/or can be implemented within application specific code.

Configuration interface 350 shows some possible configuration settings for interface 305. Control lock preferences established by interface 350 can include configurable options 352, 354, and 356. Auto-enable close lock option 352 can be a configurable option to select when to automatically enable a control lock on the GUI close control. Some options for configurable option 352 can be, but are not limited to, all conversations, group chats only, single chats only (i.e. with one other party), or the like. Unlock option 354 can be a configurable option to select what unlocking a control lock requires. Some options for configurable option 354 can be, but are not limited to, user authentication such as a username and password combination, double-clicking, a user-defined hotkey, or the like. Automatically relock option 356 can be a configurable option to relock an unlocked control lock after a predetermined length of time.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for preventing an unintentionally closing of a window comprising:

providing a user selectable mechanism within a graphical user interface for locking and unlocking a plurality of different types of user selectable, visually presented controls of a window within a graphical user interface, on a per control type basis;

establishing a plurality of user configured settings to automatically lock/unlock at least one of said presented control of a designated type, referred to herein as the window control, depending upon a deterministic system condition for a percentage of the window area that is viewable to the user as contrasted against a portion of a window area that is obscured by another different window within the graphical user interface;

detecting a change in said deterministic system condition, which triggers a change of said locked state based upon said user configured settings;

automatically firing an event based upon said detecting of said change;

detecting the event associated with said user selectable mechanism that changes a locking state of the window control of the designated type without affecting other ones of the different types of the controls; and responsive to the event, changing a locking state of each of the presented controls of the designated type within said window without affecting any other type of control of the window, wherein locking states comprise at least a locked state and an unlocked state, wherein when each of the controls of the designated type in said window is in a locked state a user is prevented from performing an action related to the control and wherein each control in a locked state includes a control specific visual indicator that indicates to users that the specific one of the user selectable controls is locked, and when each of the controls of the designated type in said window is in an unlocked state, a user is permitted to perform the action related to the control, wherein the different types of control comprise a close control type that closes the window, a minimize control type that minimizes the window, and a maximize/restore control type that selectively maximizes the window.

2. The method of claim 1, further comprising:

receiving a manual user input for toggling the locked state, wherein the manual user input is a selection of a displayed GUI control by positioning a GUI pointer over the displayed GUI control then performing a selection action for the displayed GUI control; and firing said event based upon said received user input.

3. A computer program product comprising:

a non-transitory computer usable storage medium having computer usable program code embodied therewith, the computer usable program code comprising:

computer usable program code configured to provide a user selectable mechanism within a graphical user interface for locking and unlocking a plurality of different types of user selectable, visually presented controls of a window within a graphical user interface, on a per control type basis;

computer usable program code configured to establish a plurality of user configured settings to automatically lock/unlock at least one of said presented control of a designated type, referred to herein as the window control, depending upon a deterministic system condition for a percentage of the window area that is viewable to the user as contrasted against a portion of a window area that is obscured by another different window within the graphical user interface;

computer usable program code configured to detect a change in said deterministic system condition, which triggers a change of said locked state based upon said user configured settings;

computer usable program code configured to automatically fire an event based upon said detecting of said change;

computer usable program code configured to detect the event associated with said user selectable mechanism that changes a locking state of the window control of the designated type without affecting other ones of the different types of the controls; and computer usable program code configured to responsive to the event, change a locking state of each of the presented controls of the designated type within said window without affecting any other type of control of the window, wherein locking states comprise at least a locked state and an unlocked state, wherein when each of the controls of the designated type in said window is in a locked state a user is prevented from performing an action related to the control and wherein each control in a locked state includes a control specific visual indicator that indicates to users that the specific one of the user selectable controls is locked, and when each of the controls of the designated type in said window is in an unlocked state, a user is permitted to perform the action related to the control, wherein the different types of control comprise a close control type that closes the window, a minimize control type that minimizes the window, and a maximize/restore control type that selectively maximizes the window.

4. A computing device comprising hardware and software, wherein said software is stored on at least one non-transitory storage medium, wherein said hardware is operable to execute said software causing said computing device to:

provide a user selectable mechanism within a graphical user interface for locking and unlocking a plurality of different types of user selectable, visually presented controls of a window within a graphical user interface, on a per control type basis;

establish a plurality of user configured settings to automatically lock/unlock at least one of said presented control of a designated type, referred to herein as the window control, depending upon a deterministic system condition for a percentage of the window area that is viewable to the user as contrasted against a portion of a window area that is obscured by another different window within the graphical user interface;

detect a change in said deterministic system condition, which triggers a change of said locked state based upon said user configured settings;

automatically fire an event based upon said detecting of said change;

detect the event associated with said user selectable mechanism that changes a locking state of the window control of the designated type without affecting other ones of the different types of the controls; and responsive to the event, change a locking state of each of the presented controls of the designated type within said window without affecting any other type of control of the window, wherein locking states comprise at least a locked state and an unlocked state, wherein when each of the controls of the designated type in said window is in a locked state a user is prevented from performing an action related to the control and wherein each control in a locked state includes a control specific visual indicator that indicates to users that the specific one of the user selectable controls is locked, and when each of the controls of the designated type in said window is in an unlocked state, a user is permitted to perform the action related to the control, wherein the different types of control comprise a close control type that closes the window, a minimize control type that minimizes the window, and a maximize/restore control type that selectively maximizes the window.

* * * * *